(12) United States Patent
Okumura

(10) Patent No.: US 8,979,443 B2
(45) Date of Patent: Mar. 17, 2015

(54) INSERT FOR DRILL

(75) Inventor: Takashi Okumura, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 1298 days.

(21) Appl. No.: 12/808,655

(22) PCT Filed: Oct. 23, 2008

(86) PCT No.: PCT/JP2008/069240
§ 371 (c)(1),
(2), (4) Date: Mar. 2, 2011

(87) PCT Pub. No.: WO2009/084315
PCT Pub. Date: Jul. 9, 2009

(65) Prior Publication Data
US 2011/0164936 A1    Jul. 7, 2011

(30) Foreign Application Priority Data
Dec. 28, 2007   (JP) ................. 2007-339661

(51) Int. Cl.
*B23B 51/02*   (2006.01)
*B23B 51/04*   (2006.01)
*B23B 27/14*   (2006.01)

(52) U.S. Cl.
CPC ............ *B23B 51/048* (2013.01); *B23B 27/143* (2013.01); *B23B 2200/321* (2013.01)
USPC ............ 408/189; 408/1 R; 408/223; 407/113

(58) Field of Classification Search
CPC .......... B23D 77/00; B23D 51/00; B26D 3/00; B26D 1/00; B23P 15/28; B27G 15/00
USPC ............ 407/113, 114, 115, 116, 35; 408/223, 408/231, 230, 224, 713, 189, 1 R
See application file for complete search history.

(56) References Cited

U.S. PATENT DOCUMENTS 4,194,862 A  *  3/1980  Zweekly ............... 408/224
6,241,430 B1     6/2001  Norstrom
(Continued)

FOREIGN PATENT DOCUMENTS

DE    202008001348 U1   7/2009
EP       1002604 A2     5/2000
(Continued)

OTHER PUBLICATIONS

Chinese language office action dated Nov. 17, 2011 and its English language translation issued in corresponding Chinese application 2008801264451.
(Continued)

*Primary Examiner* — Daniel Howell
*Assistant Examiner* — Chwen-Wei Su
(74) *Attorney, Agent, or Firm* — Volpe and Koenig, P.C.

(57) ABSTRACT

A drill insert of the present invention comprises a corner part, and an upper face having a first side and a second side disposed on both sides of the corner part, respectively. The drill insert comprises a first cutting edge formed along the first side; a second cutting edge formed along the second side; a first region of the upper face located along the first cutting edge;
a second region of the upper face located along the second cutting edge; and a first raised part disposed in the first region so as to lie at a higher position than the second region. The first raised part has an upper portion; a breaker portion configured to be inclined so as to become at a lower position as the first raised part extends from the upper portion; and a side portion configured to be inclined so as to become at a lower position as the side portion extends from the upper portion. The first raised part is disposed at a position closer to the first cutting edge than a bisector of the corner part when viewed from above.

12 Claims, 13 Drawing Sheets

(56) References Cited

U.S. PATENT DOCUMENTS

| | | | |
|---|---|---|---|
| 6,543,970 B1 * | 4/2003 | Qvarth et al. | 407/114 |
| 7,351,017 B2 * | 4/2008 | Kruszynski et al. | 408/223 |
| 2010/0322732 A1 | 12/2010 | Mergenthaler et al. | |

FOREIGN PATENT DOCUMENTS

| | | | |
|---|---|---|---|
| JP | 10-180521 | | 7/1998 |
| JP | 2001-239412 | | 9/2001 |
| JP | 2001-252809 | | 9/2001 |
| JP | 2001252809 A | * | 9/2001 |
| JP | 2008-200825 | | 9/2008 |

OTHER PUBLICATIONS

Extended European search report dated Jan. 12, 2011 for corresponding European application 08866497.4.

* cited by examiner (a)

(b)

(a)

(b)

(a)

(b)

(c)

INSERT FOR DRILL

CROSS-REFERENCE TO THE RELATED APPLICATIONS

This application is a national stage of international application No. PCT/JP2008/069240, filed on Oct. 23, 2008, and claims the priority under 35 USC 119 to Japanese Patent Application No. 2007-339661, filed on Dec. 28, 2007, the entire contents of which are incorporated herein by reference.

TECHNICAL FIELD

The present invention relates to a drill insert having excellent chip discharge performance.

BACKGROUND ART

As a drill for drilling holes, there are for example those in which an inner insert and an outer insert are detachably attached to the tip end of a holder so that their respective rotation loci are partially overlapped with each other. Among others, those in which the inner insert and the outer insert have the same shape are frequently used. That is, the drill in which one type of drill insert (hereinafter referred to as "insert" in some cases) is detachably attached to each of the inner side and the outer side at the tip end of the holder is frequently used.

The inserts used for this drill include an inner cutting edge and an outer cutting edge. The inner cutting edge is the cutting edge for mainly cutting (machining) an inner portion of a bottom face of a hole when it is used as the inner insert. The outer cutting edge is the cutting edge for mainly cutting an outer portion of a bottom face of a hole when it is used as the outer insert.

For example, the insert described in Japanese Unexamined Patent Application Publication No. 10-180521 has the inner cutting edge and the outer cutting edge adjacent to each other which are formed at the intersection portion between the upper face and the side face. Breaker grooves for treating chips are formed along both cutting edges in the upper face.

One of these inserts and the other are respectively attached as the inner insert and the outer insert to insert pockets formed at the tip end portions of a substantially columnar holder. The hole drilling of a work material is carried out with both cutting edges by rotating the holder around the axis of the holder. The chips generated during the hole drilling are treated through the breaker grooves of the inserts. These breaker grooves are formed in substantially the same shape over the entire periphery of the inserts.

However, the rotational speed of the inner cutting edge and the outer cutting edge differ in rotational speed. Therefore, the chip shape generated by the inner cutting edge and the chip shape generated by the outer cutting edge usually differ widely from each other. That is, the chips generated by the inner cutting edge have a spiral three-dimensionally complicated shape. The chips generated by the outer cutting edge have a spring-like curled shape.

Particularly, when machining a work material having excellent ductility, such as stainless steels or low carbon steels, the chips generated by the outer cutting edge under high rotational speed are unsusceptible to curling, so that they are likely to extend without being cut and likely to cling to the holder during the machining. There has been the problem that these chips cannot be smoothly discharged through the breaker grooves.

For example, the insert described in Japanese Unexamined Patent Application Publication No. 2001-252809 includes an inner cutting edge, an outer cutting edge, a recess shape breaker groove formed along the outer cutting edge, and a raised part formed along the breaker groove. The raised part is located at a higher position than the upper face located along inner cutting edge.

According to this insert, the chips generated by the outer cutting edge under high speed rotation can be curled and cut by the breaker grooves and the raised part, thus achieving improvement of chip discharge performance. It is hence considered that in order to machine the work material having excellent ductility, the chips generated by the outer cutting edge may be further curled and the height of the raised part may be further increased therefor.

However, there has been the problem that merely increasing the height of the raised part increases the level difference between the raised part and the upper face along the inner cutting edge, thereby making it easy for the chips to accumulate at the level difference portion. Particularly, there has been a noticeable problem that the chips having a three-dimensionally complicated shape generated by the inner cutting edge accumulate at the level difference portion of the inner cutting edge located at the outer periphery side of the inner cutting edge which corresponds to a discharge direction in which the chips generated by the inner cutting edge are discharged outside of the holder.

That is, there has been the problem that a further increase in the height of the raised part for improving the discharge performance of the chips generated by the outer cutting edge contributes to improving the discharge performance of the chips generated by the outer cutting edge, while deteriorating the discharge performance of the chips having the three-dimensionally complicated shape generated by the inner cutting edge.

DISCLOSURE OF THE INVENTION

An aspect of the present invention is to provide a drill insert having excellent chip discharge performance.

A drill insert according to an embodiment of the present invention comprises a corner part, and an upper face having a first side and a second side disposed on both sides of the corner part, respectively. The drill insert comprises a first cutting edge formed along the first side; a second cutting edge formed along the second side; a first region of the upper face located along the first cutting edge; a second region of the upper face located along the second cutting edge; and a first raised part disposed in the first region and is configured to lie at a higher position than the second region. The first raised part has an upper portion; a breaker portion configured to be inclined so as to lie at a lower position as the first raised part extends from the upper portion toward the first cutting edge; and a side portion configured to be inclined so as to lie at a lower position as the first raised part extends from the upper portion toward the second region. The first raised part is disposed at a position closer to the first cutting edge than a bisector of the corner part when viewed from above.

A drill according to an embodiment of the present invention comprises: a holder comprising a first insert pocket formed at an outer periphery side of a tip end portion thereof, and a second insert pocket formed at a central axis side of the tip end portion thereof; and a pair of the drill inserts. One of the pair of the drill inserts is attached to the first insert pocket so that at least a part of the first cutting edge protrudes from the tip end of the holder. The other is attached to the second insert pocket so that at least a part of the second cutting edge protrudes from the tip end of the holder.

A method of cutting a work material according to an embodiment of the present invention includes the following steps (i) to (iv):

(i) the step of rotating either one of the drill and a work material;

(ii) the step of bringing the first cutting edge and the second cutting edge of the drill closer to the work material;

(iii) the step of cutting the work material by bringing the first cutting edge and the second cutting edge of the drill into contact with the surface of the work material; and (iv) the step of separating the first cutting edge and the second cutting edge from the work material.

According to the drill insert, the drill, and the cutting method, it is capable of suitably curling and cutting the chips generated by the first cutting edge (the outer cutting edge). It is also capable of ensuring a wide discharge space of the chips generated by the second cutting edge (the inner cutting edge). Consequently, the chips generated by any one of the first cutting edge and the second cutting edge can be smoothly discharged.

PREFERRED EMBODIMENTS FOR CARRYING OUT THE INVENTION

Drill Insert

First Embodiment

Figure 1:
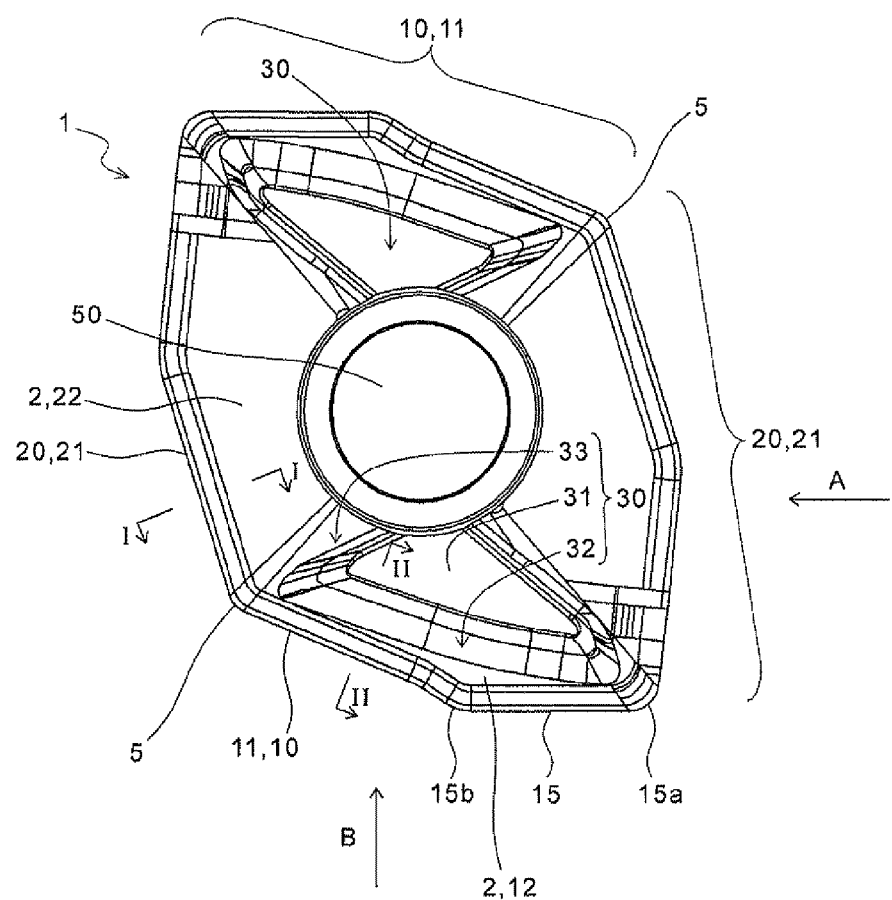
FIG. 1 is a plan view showing a drill insert according to a first embodiment of the present invention.

A first embodiment of the drill insert according to the present invention is described below in detail with reference to FIG. 1 to FIG. 5(d). As shown in FIG. 1, an insert 1 according to the present embodiment has a substantially polygonal plate shape when viewed from above. The insert 1 is constructed from one in which a film is coated onto a sintered body such as cemented carbide, cermet, ceramics, or the like. The film is for improving the wear resistance of the insert 1. As the composition thereof, there are for example titanium based compounds such as titanium carbide, titanium nitride, and titanium carbon nitride, alumina, or the like. The film may be made of at least one layer or alternately, a plurality of layers. The insert 1 is not limited to these film-coated ones, and those constructed from the sintered body without a film coated thereon may be used.

The insert 1 includes an upper face 2. A through hole 50 is formed at a mid-portion of the upper face 2. The through hole 50 penetrates through a lower face 4 of the insert 1 shown in FIGS. 2(a) and 2(b), and is used for fixing the insert 1 to an insert pocket of a holder. The insert 1 has a 180-degree rotationally symmetric shape with respect to the central axis of the through hole 50. It is therefore economical because when one cutting edge in use is worn, the other cutting edge not yet used can be used by rotating the insert 1 180 degrees.

The insert 1 includes a corner part 5. The upper face 2 has a first side 10 and a second side 20 disposed on both sides of the corner part 5, respectively. Both of the first side 10 and the second side 20 are located at a ridge part of the upper face 2 and are continuous with the corner part 5. In these first side 10 and second side 20, a first cutting edge 11 (an outer cutting edge) and, a second cutting edge 21 (an inner cutting edge) are formed along the first side 10 and the second side 20, respectively.

In these first and second cutting edges 11 and 21, the second cutting edge 21 is formed at an intersection portion between the upper face 2 and a side face 3 constituting a flank face of the insert 1, as shown in FIG. 2(a). The second cutting edge 21 is used mainly for cutting (machining) an inner portion of a bottom face of a hole when used as the inner insert.

A second region 22 of the upper face 2 located along the second cutting edge 21 is located at a lower position than the second cutting edge 21 in a thickness direction as shown in FIG. 3(a). As used herein, the lower position in the thickness direction means the positional relationship in a direction substantially vertical to a flat surface when the lower face 4 is placed on the flat surface. Hereinafter, the descriptions "low position in the thickness direction" and "high position in the thickness direction" are defined similarly thereto. A land 6 and a rake face 7 are formed in the second region 22 in this order from the second cutting edge 21.

The land 6 is formed along the second cutting edge 21 and adapted to improve the cutting edge strength thereby to reduce the cutting edge chipping. The land 6 has a predetermined width, and the width thereof is usually approximately 0.05 to 0.15 mm depending on the work material and cutting conditions.

The rake face 7 is the face along which the generated chips graze, and is inclined downward at a predetermined rake angle α1 to the second cutting edge 21. The rake angle α1 may be adjusted to an optional angle depending on the work material. Although no particular limitation is imposed thereon, it is usually approximately 5 to 25 degrees.

The rake angle α1 can be obtained as an angle formed between a virtual extension line L2 of the rake face 7 and a line L3 parallel to the lower face 4 in the cross section substantially vertical to the second cutting edge 21. In the case where the rake face 7 is constituted by a curved face, a virtual line at the intersection between the rake face and the land 6 or the second cutting edge 21 is plotted in such a sectional view as shown in FIG. 3(a), and an angle formed between the virtual line and the line L3 parallel to the lower face 4 can be obtained as a rake angle.

On the other hand, the first cutting edge 11 is formed at the intersection portion between the upper face 2 and the side face 3 as shown in FIG. 2(b). The first cutting edge 11 is used mainly for cutting the outer portion of a bottom face of a hole when used as the outer insert.

The first cutting edge 11 has at its one end a protrusion 15 protruding outward from the insert 1 when viewed from above. This improves the bite of the first cutting edge 11 into the work material, thereby reducing the cutting edge fracture.

The protrusion 15 has round ends 15a and 15b. The round ends 15a and 15b mean those in which an angle formed between two straight lines being continuous with both sides of a curved portion is near a right angle and within the range of 60 to 160 degrees. The first cutting edge 11 is not limited to the construction having the protrusion 15.

As shown in FIG. 3(b), a first raised part 30 having a land 16, a rake face 17, a breaker portion 32 and an upper portion 31 disposed in this order from the first cutting edge 11 is formed in a first region 12 of the upper face 2 located along the first cutting edge 11. The land 16 is formed along the first cutting edge 11, and the width thereof is usually approximately 0.05 to 0.15 mm.

The rake face 17 is inclined downward at a rake angle α2 with respect to the first cutting edge 11. The breaker portion 32 is formed at a predetermined rise angle β from the rake face 17 toward the inside of the insert 1 (toward the through hole 50). That is, the rake face 17 and the breaker portion 32 are respectively formed in the shape of an inclined face so as to be once lowered from the first cutting edge 11 and then raised toward the inside of the insert 1.

The rake angle α2 and the rise angle β may be respectively adjusted to an optional angle depending on the work material. Although no particular limitation is imposed thereon, usually, the rake angle α2 is approximately 5 to 25 degrees, and the rise angle β is approximately 20 to 45 degrees.

Similarly to the rake angle α1, the rake angle α2 can be obtained as an angle formed between a virtual extension line L4 of the rake face 17 and the line L3 parallel to the lower face 4 in the cross section substantially vertical to the first cutting edge 11. The rise angle β can be obtained as an angle formed between a virtual extension line L5 of the breaker portion 32 and the line L3 parallel to the lower face 4 in the cross section substantially vertical to the first cutting edge 11. If the breaker portion 32 is constituted by a curved face, both can be obtained similarly to the case where the rake face is constituted by the curved face.

The distance d1 between an end p1 of the rake face 17 adjacent to the first cutting edge and an end p2 of the breaker portion 32 adjacent to the upper portion is preferably approximately 1.2 to 2 mm. The distance d1 contributes to chip curling action. As shown in FIG. 3(b), the distance d1 can be measured as a dimension parallel to the lower face 4 in the cross section substantially vertical to the first cutting edge 11.

The end p1 is located at the boundary portion between the rake face 17 and the land 16. The end p2 is located at the boundary portion between the breaker portion 32 and the upper portion 31. If the rake face 17 is formed continuously to the first cutting edge 11 without having the land 16, the end p1 is located at the boundary portion between the rake face 17 and the first cutting edge 11.

The distance d2 from the first cutting edge 11 to the lowermost point of the rake face 17 and the breaker portion 32 is preferably approximately 0.03 to 0.15 mm. As shown in FIG. 3(b), the distance d2 can be measured as the maximum dimension in a direction vertical to the lower face 4 in the cross section substantially vertical to the first cutting edge 11.

Figure 2:
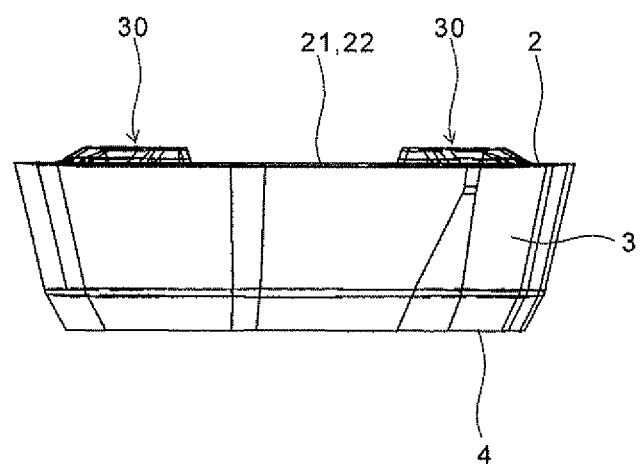
FIG. 2(a) is a side view when the drill insert shown in FIG. 1 is viewed from the side indicated by the arrow A.
FIG. 2(b) is a side view when the drill insert shown in FIG. 1 is viewed from the side indicated by the arrow B.
Figure 2:
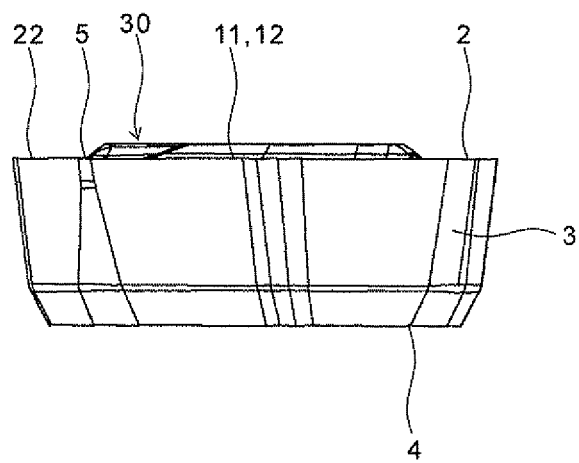
Figure 3:
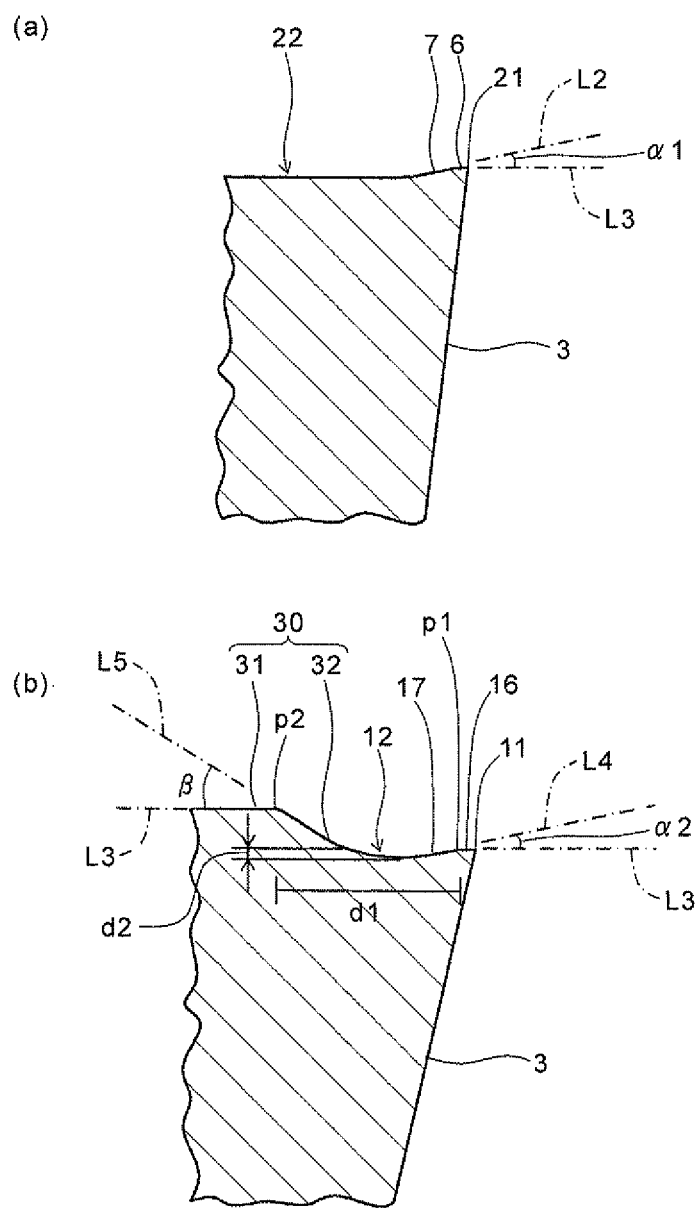
FIG. 3(a) is an enlarged view showing the cross section taken along the line I-I in FIG. 1.
FIG. 3(b) is an enlarged view showing the cross section taken along the line II-II in FIG. 1.

As shown in FIG. 2, the first raised part 30 is disposed to lie at a higher position than the second region 22. Specifically, as shown in FIG. 3, the upper portion 31 of the first raised part 30 is located at a higher position than the second region 22. The upper portion 31 is located at a higher position than the first cutting edge 11 in the thickness direction. The breaker portion 32 is inclined from the upper portion 31 so as to lie at a lower position toward the first cutting edge 11. By having the first raised part 30, the insert 1 can suitably curl and cut the chips generated by the first cutting edge 11.

Hereat, to achieve the arrangement that the upper portion 31 is located at the higher position than the first cutting edge 11 in the thickness direction, it is recommended that the upper portion 31 be substantially located at a higher position than the first cutting edge 11 in the thickness direction. That is, a part of the upper portion 31 which is adjacent to the breaker portion 32 may be located at a higher position than the first cutting edge 11 in the thickness direction. Thereby, the rake face 17 and the breaker portion 32 can stably curl the chips generated by the first cutting edge 11.

The upper portion 31 is preferably located at a position that is approximately 0.15 to 0.4 mm higher than the first cutting edge 11 and approximately 0.2 to 0.5 mm higher than the second region 22 in the thickness direction, depending on the work material and the cutting conditions.

The first raised part 30 has a side portion 33 inclined from the upper portion 31 so as to lie at a lower position toward the second region 22, as shown in FIG. 1. The side portion 33 is formed in the shape of an inclined face from the first region 12 toward the upper portion 31.

Figure 4:
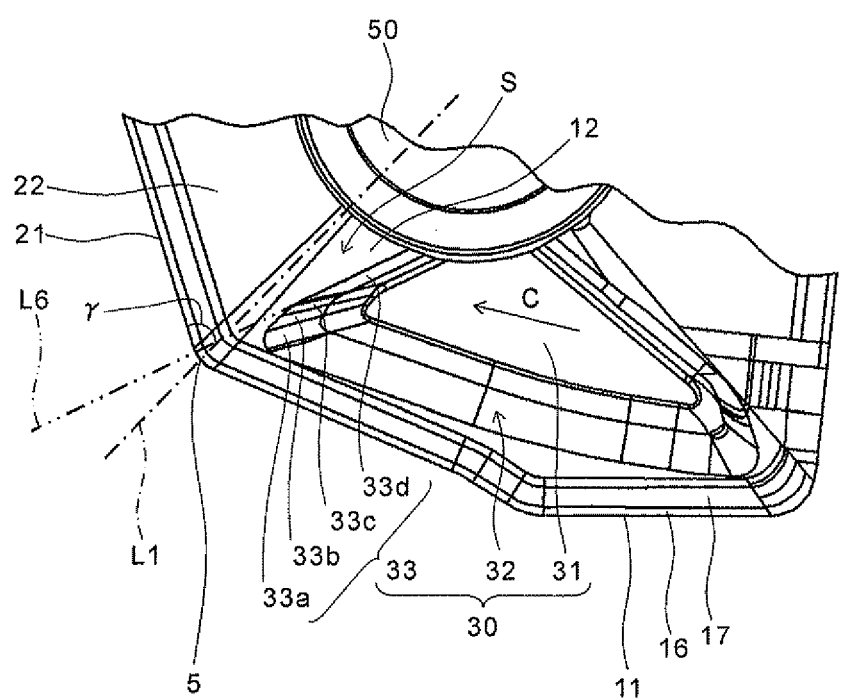
FIG. 4 is a partially enlarged plan view showing the vicinity of a first raised part of the drill insert shown in FIG. 1.
Figure 5:
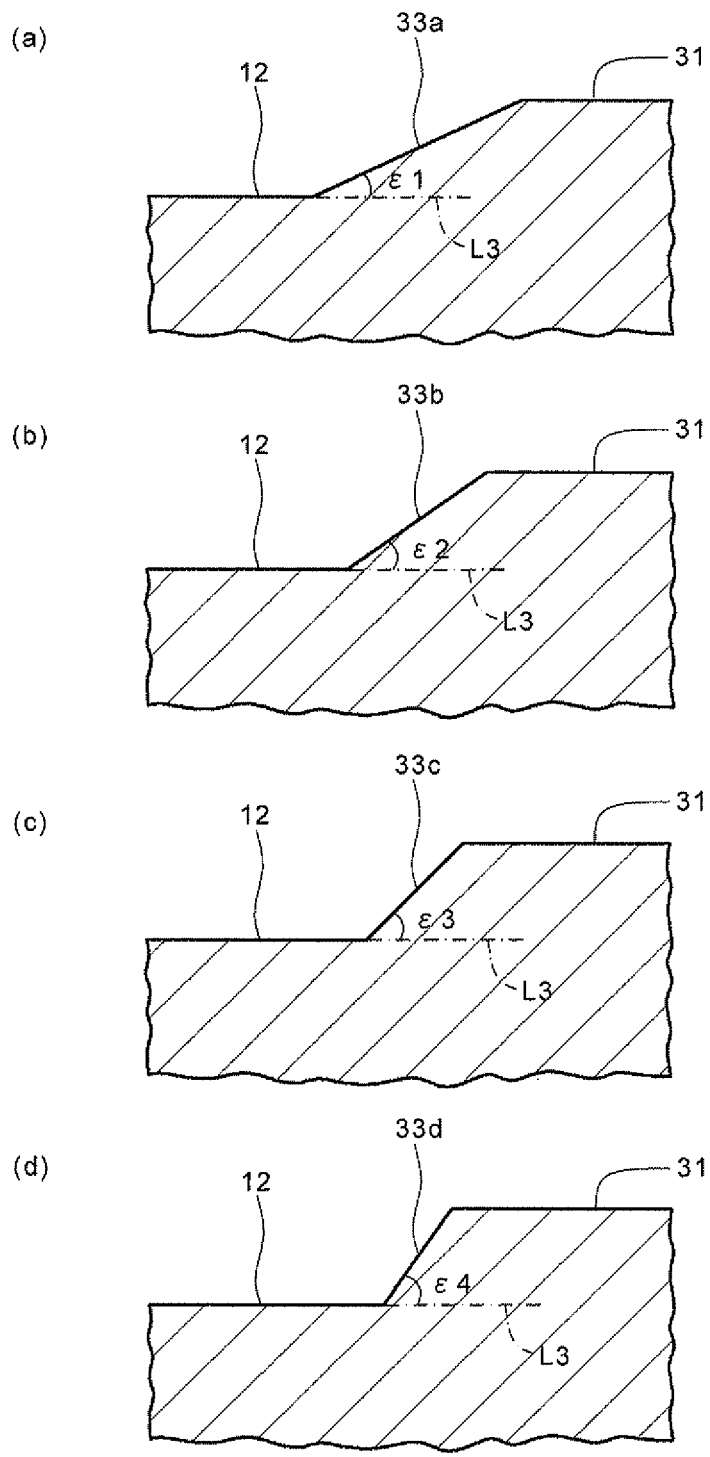
FIGS. 5(a) to 5(d) are schematic explanatory drawings showing an inclination angle in a side portion of the drill insert shown in FIG. 1.

As shown in FIG. 4, the first raised part 30 is disposed at a position closer to the first cutting edge 11 than a bisector L1 of the corner part 5 when viewed from above. Specifically, the side portion 33 of the first raised part 30 is disposed at a position closer to the first cutting edge 11 than the bisector L1 when viewed from above. This ensures a wide discharge space S of the chips generated by the second cutting edge 21. Hence, the insert 1 can also smoothly discharge the chips generated by the second cutting edge 21.

That is, owing to the first raised part 30 having the shape described above, the insert 1 can smoothly discharge the chips generated by any one of the first cutting edge 11 and the second cutting edge 21. It is therefore capable of improving machining accuracy according to the insert 1. Particularly, the insert 1 can exhibit excellent chip discharge performance during machining of the work material having excellent ductility, such as stainless steels or low carbon steels. Hence, the insert 1 is the insert also having high availability. As used herein, the bisector L1 of the corner part 5 means the bisector of the angle formed between the first cutting edge 11 and the second cutting edge 21.

The first raised part 30 is formed to become further away from the bisector L1 toward the center of the upper face 2 (toward the through hole 50) when viewed from above. Specifically, the side portion 33 is formed so that an angle γ formed between the second cutting edge 21 and the side portion 33 becomes 85 to 95 degrees when viewed from above. This increases the discharge space S of the chips generated by the second cutting edge 21 having the three-dimensionally complicated shape, thereby enhancing the chip discharge performance. As shown in FIG. 4, the angle γ can be obtained as an angle formed between a virtual extension line L6 obtained by extending the boundary line between the first region 12 and the side portion 33 toward the second cutting edge 21.

The inclination angle of the side portion 33 is increased toward the center of the upper face 2. Specifically, the side portion 33 has a first face 33a, a second face 33b, a third face 33c and a fourth face 33d in this order from the corner part 5. These faces 33a to 33d have their respective inclination angles as shown in FIGS. 5(a) to 5(d). That is, the first face 33a, second face 33b, third face 33c and fourth face 33d have inclination angles ε1, ε2, ε3 and ε4, respectively. These inclination angles ε1 to ε4 have the following relationship: ε1<ε2<ε3<ε4. This increases the volume of the first raised part 30 and ensures the strength of the first raised part 30, while ensuring the wide chip discharge space S.

Particularly, the inclination angle ε1 of the first face 33a nearmost the bisector L1 is preferably 20 40 degrees, and the inclination angle ε4 of the face 33d nearmost the center of the upper face 2 is preferably 50 to 70 degrees. Within these inclination angles, the inclination angle of the side portion 33 is preferably increased toward the center of the upper face 2. As used herein, the inclination angle is the inclination angle of the side portion 33 to the lower face 4. More specifically, these inclination angles ε1 to ε4 can be obtained as angles formed between the individual faces 33a to 33d and the line L3 parallel to the lower face 4 in the cross section substantially vertical to the individual faces 33a to 33d, respectively.

On the other hand, as shown in FIG. 4, the upper portion 31 is constituted by an inclined face which is inclined to lie at a lower position toward the direction indicated by the arrow C in the thickness direction. This decreases the level difference between the first raised part 30 and the second region 22, thus enhancing the chip discharge performance of both the first cutting edge 11 and the second cutting edge 21.

Second Embodiment

Figure 6:
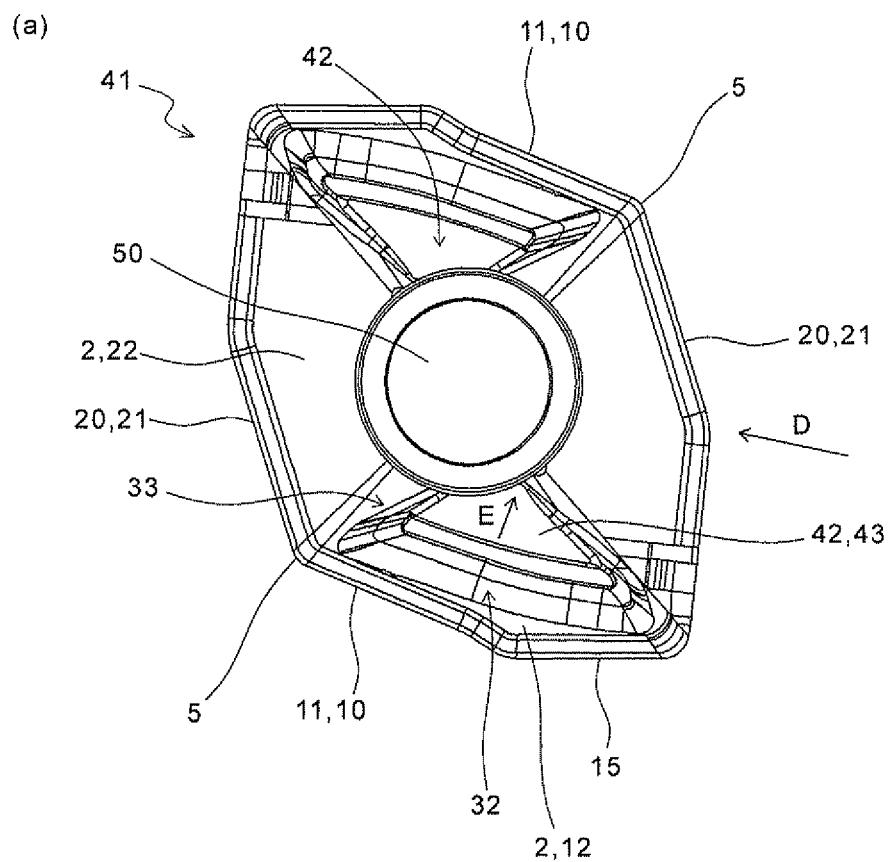
FIG. 6(a) is a plan view showing a drill insert according to a second embodiment of the present invention.
FIG. 6(b) is a side view when the drill insert shown in FIG. 6(a) is viewed from the side indicated by the arrow D.
Figure 6:
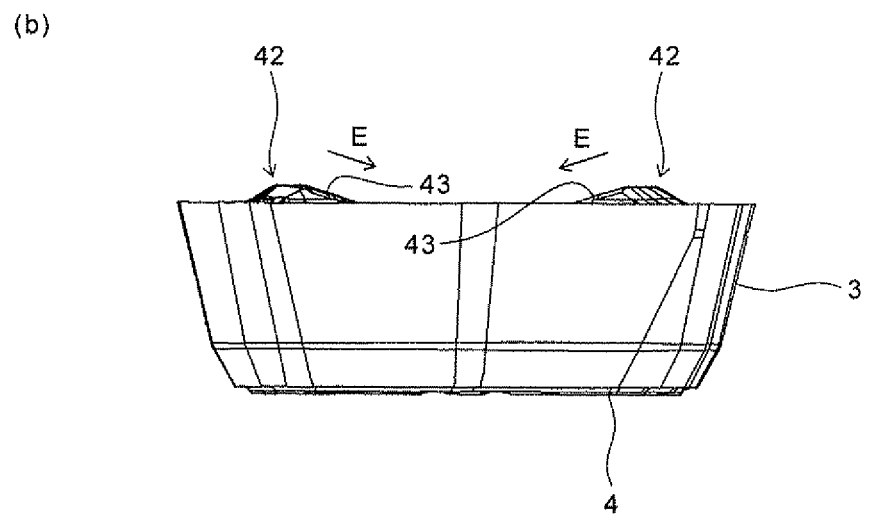

The insert according to a second embodiment is described below in details with reference to FIG. 6. In FIG. 6, similar reference numerals are used to denote the components similar to those in FIGS. 1 to 5(d) described above, and the descriptions thereof are omitted.

As shown in FIGS. 6(a) and 6(b), in the insert 41 according to the present embodiment, an upper portion 43 of a first raised part 42 is comprised of an inclined face which is inclined to lie at a lower position in a thickness direction toward the center of an upper face 2, namely, in the direction indicated by the arrow E. This ensures a wide chip discharge space S, while maintaining the height of the first raised part 42. It is therefore capable of enhancing the chip discharge performances of both a first cutting edge 11 and a second cutting edge 21.

The direction indicated by the arrow E is the direction substantially vertical to the first cutting edge 11. The direction indicated by the arrow D in FIG. 6(a) is the direction substantially parallel to the first cutting edge 11. In the case of having a protrusion 15 as in the present embodiment, the direction substantially vertical to the first cutting edge 11 means the direction substantially vertical to a virtual line connecting both ends of the first cutting edge 11. Similarly, the direction substantially parallel to the first cutting edge 11 means the direction substantially parallel to the virtual line connecting both ends of the first cutting edge 11. Other constructions are similar to those in the insert 1 according to the first embodiment.

Third Embodiment

Figure 7:
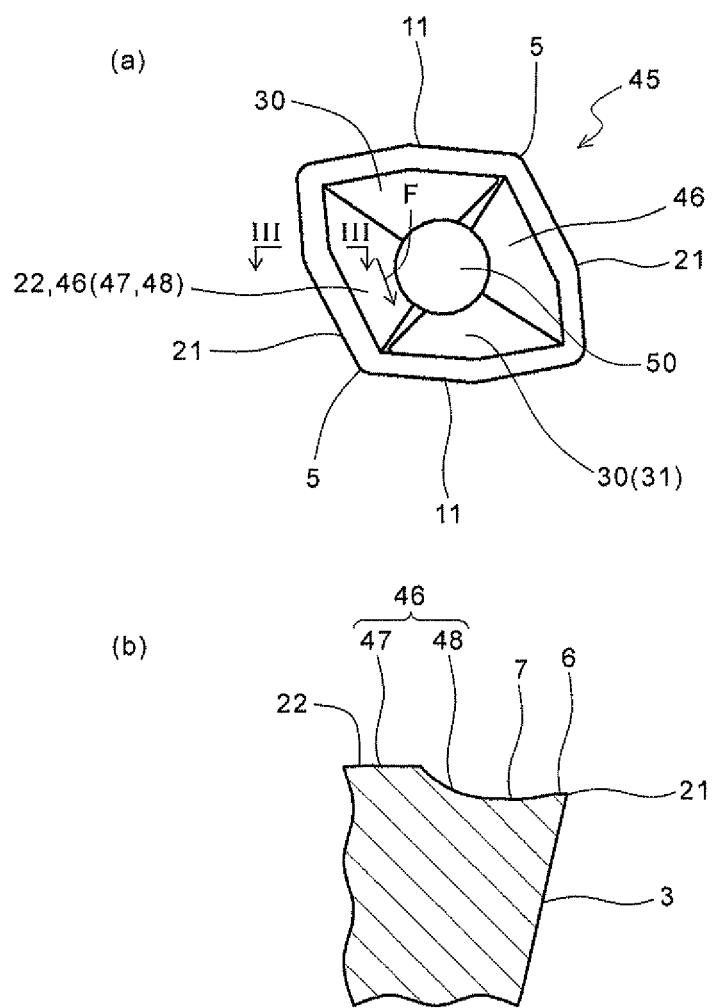
FIG. 7(a) is a schematic plan view showing a drill insert according to a third embodiment of the present invention.
FIG. 7(b) is an enlarged view showing the cross section taken along the line in FIG. 7(a)

In the insert according to a third embodiment, an upper face 2 has a predetermined second raised part in addition to a first raised part 30. The insert according to the present embodiment is described below in details with reference to FIGS. 7(a) and 7(b). In FIGS. 7(a) and 7(b), similar reference numerals are used to denote the components similar to those in FIGS. 1 to 6(b) described above, and the descriptions thereof are omitted.

As shown in FIG. 7(a), the insert 45 according to the present embodiment includes the second raised part 46 in a second region 22. The second raised part 46 is disposed to lie at a lower position than the first raised part 30. Specifically, an upper portion 47 of the second raised part 46 is located at a lower position than an upper portion 31 of the first raised part 30. As shown in FIG. 7(b), the second raised part 46 has the upper portion 47, and a breaker portion 48 inclined from the upper portion 47 so as to lie at a lower position toward a second cutting edge 21. The insert 45 including the second raised part 46 can stably perform chip treatment during high speed machining.

The upper portion 47 of the second raised part 46 is comprised of an inclined face which is inclined to lie at a higher position toward a first cutting edge 11 in the thickness direction, namely, in the direction indicated by the arrow F. This decreases the level difference between the second raised part 46 and the first raised part 30, making it possible to stably curl the chips generated by the first cutting edge 11 under high rotational speed. Other constructions are similar to those in the insert 1 according to the first embodiment.

<Drill>

Figure 8:
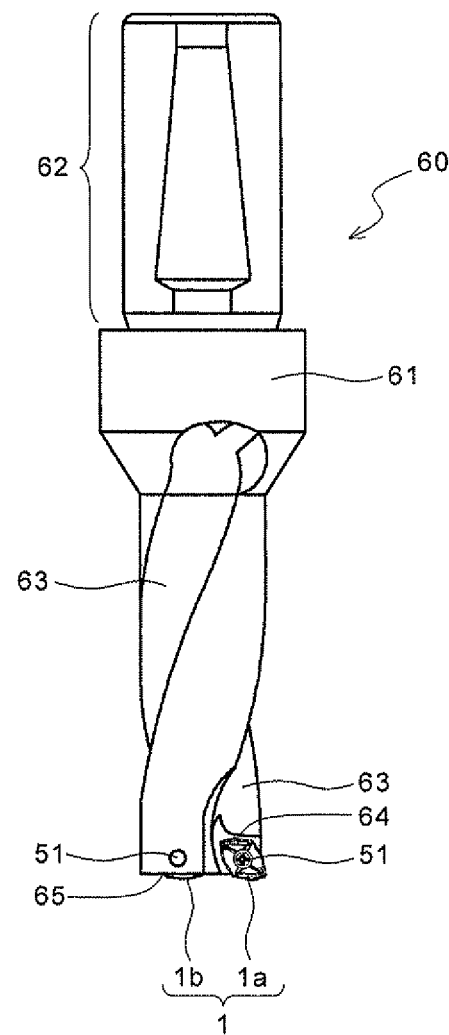
FIG. 8 is a plan view showing a drill according to a first embodiment of the present invention.
Figure 9:
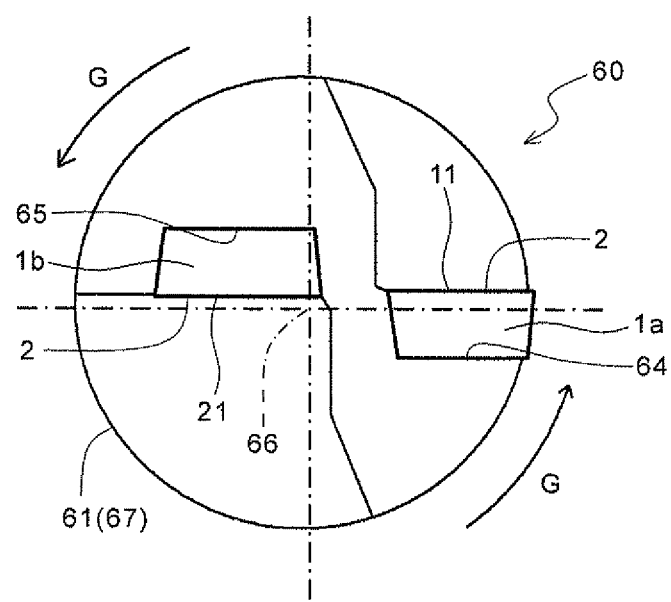
FIG. 9 is a schematic front view showing the drill shown in FIG. 8.
Figure 10:
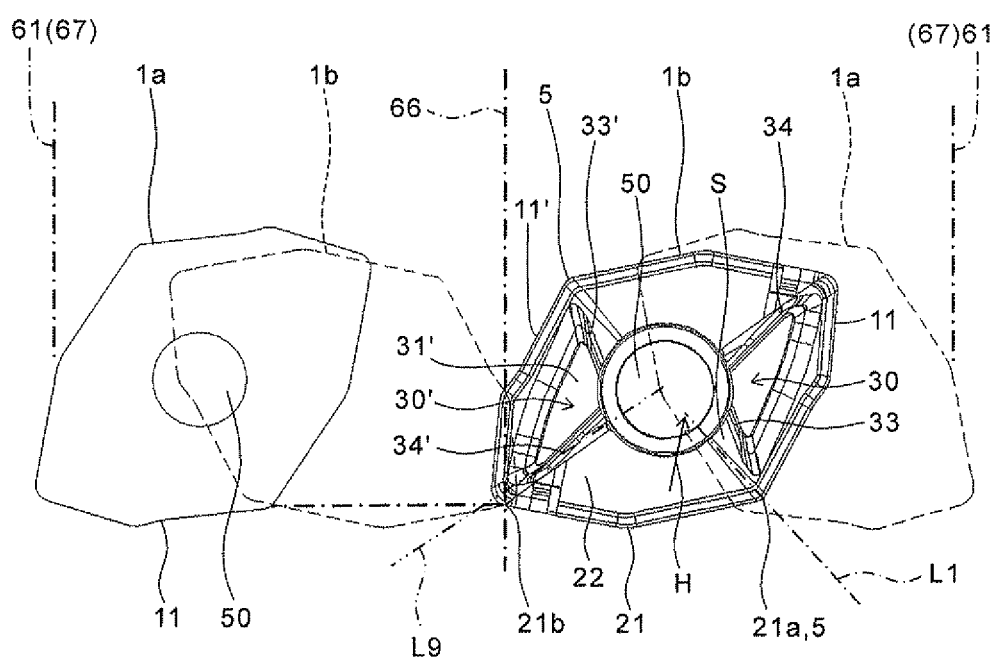
FIG. 10 is a schematic explanatory drawing showing a cut state by the drill shown in FIG. 8.

A first embodiment according to the drill of the present invention is described below in detail with reference to FIGS. 8 to 10 by taking, for example, the case of attaching the insert 1 according to the first embodiment. The insert indicated by the broken line in FIG. 10 show the state in which the insert indicated by the solid line is rotated 180 degrees. In FIGS. 8 to 10, similar reference numerals are used to denote the components similar to those in FIGS. 1 to 7(b) described above, and the descriptions thereof are omitted.

As shown in FIG. 8, the drill 60 according to the present embodiment includes a holder 61 and a pair of inserts 1. In the drill 60, one of the pair of inserts 1 and the other are attached to the tip end portions of the holder 61 as an outer insert 1a and an inner insert 1b, respectively.

Specifically, the holder 61 has a substantially columnar shape and has at its rear end a shank part 62 for fixing the holder 61 to a machining tool. A chip discharge groove 63 for discharging chips from the tip end thereof toward the shank part 62 is spirally formed along a longitudinal direction.

A first insert pocket 64 (an outer peripheral insert pocket) for attaching the outer insert 1a, and a second insert pocket 65 (an inner peripheral insert pocket) for attaching the inner insert 1b are respectively disposed at the tip end portions of the holder 61. The tip ends of both the first insert pocket 64 and the second insert pocket 65 in the axis direction of the holder 61 are opened. The radial outside of the first insert pocket 64 is also opened.

The first insert pocket 64 is for detachably attaching the outer insert 1a and formed radially outside (on the outer periphery side) in the tip end portion of the holder 61. The second insert pocket 65 is for detachably attaching the inner insert 1b and formed radially inside (on the central axis side) in the tip end portion of the holder 61. The outer insert 1a for cutting the outer portion of a bottom face of a hole, and the inner insert 1b for cutting the inner portion of a bottom face of a hole are attached in different attachment directions from each other to the first insert pocket 64 and the second insert pocket 65, respectively.

In the attachment operation, firstly, the outer insert 1a and the inner insert 1b are put in the first insert pocket 64 and the second insert pocket 65, respectively. Hereat, as shown in FIGS. 9 and 10, the outer insert 1a and the inner insert 1b are set so that the first cutting edge 11 and the second cutting edge 21 protrude from the axially tip end of the holder 61. Additionally, the rotation loci of the first cutting edge 11 and the second cutting edge 21 at the axially tip end are partially overlapped with each other so as to cover from the axis 66 to a side face 67 of the holder 61.

All of the first cutting edge 11 and the second cutting edge 21 are not required to protrude from the tip end of the holder 61. That is, it is recommended that at least a part of each cutting edge protrudes from the tip end of the holder 61 depending on the work material and the cutting conditions.

As shown in FIG. 8, fastening screws 51 are inserted into the through holes 50 of the outer insert 1a and the inner insert 1b, respectively, and the tip ends of the fastening screws 51 are screwed into screw holes (not shown) formed in the first insert pocket 64 and the second insert pocket 65, respectively. Thus, the outer insert 1a and the inner insert 1b are attached to the first insert pocket 64 and the second insert pocket 65, respectively.

The outer insert 1a and the inner insert 1b attached to their respective insert pockets are arranged so that their respective upper faces 2 face the same rotational direction (the direction indicated by the arrow G). That is, the upper face 2 of the outer insert 1a and the upper face 2 of the inner insert 1b are 180 degrees opposite from each other. The hole drilling of the work material is carried out with the first cutting edge 11 and the second cutting edge 21 by rotating the holder 61 around the axis 66 of the holder 61.

Hereat, as shown in FIG. 10, the inner insert 1b is attached to the second insert pocket 65 so that an end 21a adjacent to the bisector L1 of the second cutting edge 21 is located radially outside. As used herein, the end 21a corresponds to one of both ends of the second cutting edge 21 which is located adjacent to the corner part 5. Therefore, the inner insert 1b is attached to the second insert pocket 65 so that the corner part 5 is located radially outside.

This ensures a wide discharge space S of the chips generated by the second cutting edge 21. That is, the wide chip discharge space S can be ensured in the discharge direction of the chips generated by the second cutting edge 21, namely, the direction in which the chips are moved to the rear end and radially outward of the holder 61 (the direction indicated by the arrow H). Consequently, the chips generated by the second cutting edge 21 can be smoothly discharged without causing accumulation thereof.

On the other hand, the inner insert 1b has a first cutting edge 11' paired with the first cutting edge 11, and a first raised part 30' paired with the first raised part 30. The first raised part 30' has a side portion 34' disposed opposite to a side portion 33' through an upper portion 31'. The side portion 34' is inclined from the upper portion 31' so as to lie at a lower position toward the second region 22.

Hereat, the rotational speed at the end 21b (the end located radially inside) spaced from the bisector L1 of the second cutting edge 21 is zero. Therefore, the chips generated by the second cutting edge 21 have a spiral shape formed by using the end 21b as the starting point thereof. In the insert 1 in which both ends 21a and 21b of the second cutting edge 21 are respectively formed adjacent to the first cutting edges 11 and 11', as in the case of the inner insert 1b of the present embodiment, the side portion 34' of the first raised part 30' located adjacent to the end 21b does not noticeably affect the discharge space of the chips generated by the second cutting edge 21.

It is hence possible to form the side portion 34' along a bisector L9 of the angle formed between the first cutting edge 11' and the second cutting edge 21. Thus, the first raised part 30' is formed oppositely over the entire length of the first cutting edge 11'.

As described above, the insert 1 has the 180-degree rotationally symmetric shape with respect to the central axis of the through hole 50. Similarly, the first raised part 30 is formed oppositely on the first cutting edge over the entire length of the first cutting edge 11. Forming the first raised parts 30 and 30' over the entire lengths of the first cutting edges 11 and 11' makes it possible to stably curl and smoothly discharge the chips generated by the first cutting edges 11 and 11'. As a result, the insert 1 can exhibit excellent chip discharge performance on the chips generated by any one of the fist cutting edges 11 and 11' and the second cutting edge 21.

Second Embodiment

Figure 11:
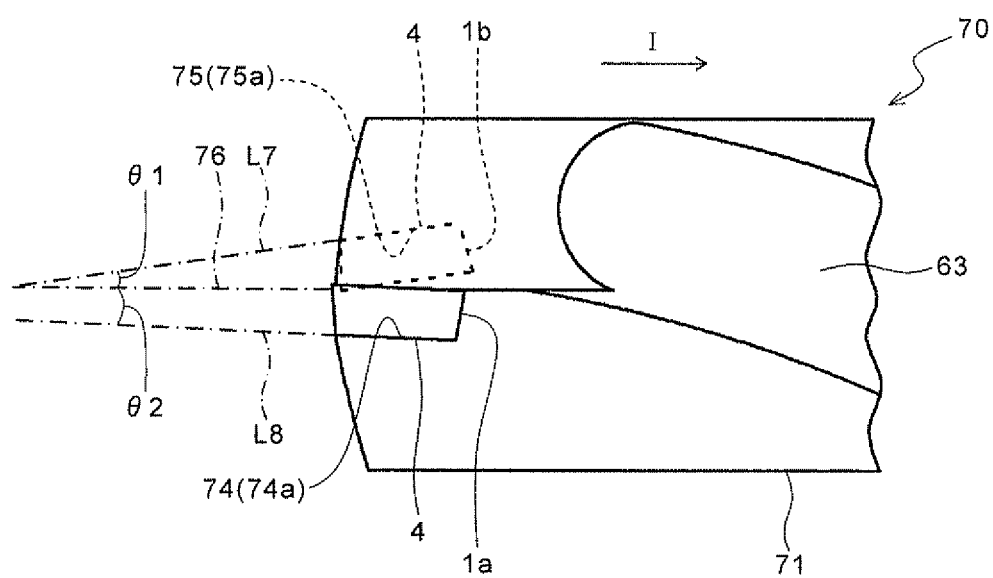
FIG. 11 is a partially enlarged side view when the vicinity of the tip end of a drill according to a second embodiment of the present invention is viewed from a first insert pocket.
Figure 12:
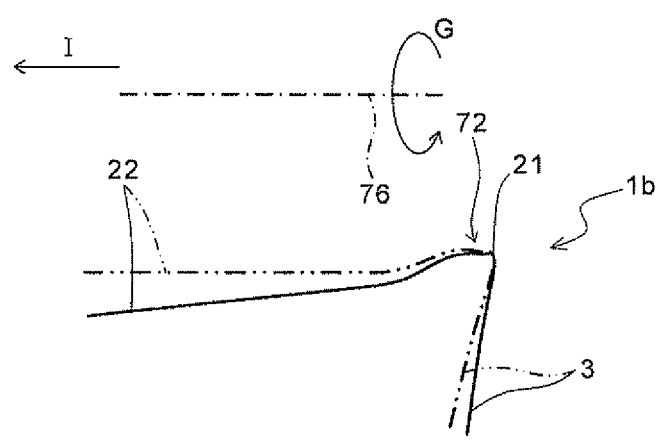
FIGS. 12(a) and 12(b) are schematic explanatory drawings showing a state in which an inner insert is attached to a second insert pocket, and a state in which an outer insert is attached to a first insert pocket in the drill shown in FIG. 11, respectively.
Figure 12:
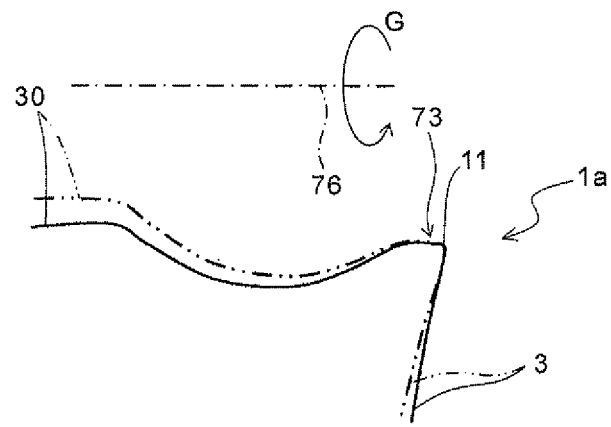

In the drill according to a second embodiment, both of first and second insert pockets have an axial rake. The drill according to the present embodiment is described below in details with reference to FIGS. 11 and 12 by taking, for example, the case of attaching the insert 1 according to the first embodiment. The inserts indicated by the dash-double dot lines in FIGS. 12(a) and 12(b) show the states of the insert units before being attached to the insert pockets. In FIGS. 11 and 12, similar reference numerals are used to denote the components similar to those in FIGS. 1 to 10 described above, and the descriptions thereof are omitted.

As shown in FIG. 11, in the drill 70 according to the present embodiment, the axial rake θ1 of a second insert pocket 75 is larger than the axial rake θ2 of a first insert pocket 74, and both of the axial rakes θ1 and θ2 are positive. Thereby, when the inner insert 1b is attached to the second insert pocket 75, as shown in FIG. 12(a), a second region 22 is inclined toward the rear end of the holder 71 (in the direction indicated by the arrow I) so as to be retracted with respect to the rotational direction of the holder 71 (the direction indicated by the arrow G). Further, as shown in FIG. 12(b), the second region 22 is greatly inclined than the first raised part 30 of the outer insert 1a attached to the first insert pocket 74.

Accordingly, even if the first raised part 30 is located at a higher position than the lower face 4 in the inert unit, the second region 22 can be located at a still lower position than the second cutting edge 21 with the inner insert 1b attached to the second insert pocket 75. This ensures a wider discharge space S of the chips generated by the second cutting edge 21.

As described above, both of the axial rakes θ1 and θ2 are positive. Therefore, with the inserts 1a and 1b attached to their respective insert pockets 74 and 75 as shown in FIGS. 12(a) and 12(b), the substantial rake angle of the second cutting edge 21 can be increased, thus improving the cutting performance thereof.

The axial rake θ1 is preferably 5 to 10 degrees, and the axial rake θ2 is preferably 2 to 7 degrees. Within these numerical ranges, the axial rake θ1 is preferably greater than the axial rake θ2. As used herein, the axial rake of the insert pocket is an angle formed between a virtual extension line of the seat face of the insert pocket and the axis of the holder.

That is, to make the axial rake θ1 greater than the axial rake θ2, as shown in FIG. 11, it is recommended that the axial rake 91 formed between a virtual extension line L7 of the seat face 75a of the second insert pocket 75 and the axis 76 of the holder 71 be greater than the axial rake θ2 formed between a virtual extension line L8 of the seat face 74a of the first insert pocket 74 and the axis 76. These seat faces 74a and 75a mean the portions of the insert pockets 74 and 75 that are insert attachment parts, respectively, which are brought into contact with the lower face 4 of the insert 1.

On the other hand, in the present embodiment the land faces of the lands 72 and 73 with the inserts 1a and 1b attached to their respective insert pockets 74 and 75 become parallel to the axis 76 of the holder 71 as shown in FIGS. 12(a) and 12(b). This improves the cutting edge strength, making it possible to reduce the cutting edge chipping.

To set the individual land faces into the predetermined states, the land faces of the lands 72 and 73 are respectively directed to the first cutting edge 11 and the second cutting edge 21 and inclined toward the lower surface 4. Hereat, it is recommended to employ, as their respective inclination angles, the angles at which the land faces of the lands 72 and 73 with the inserts 1a and 1b attached to their corresponding insert pockets 74 and 75 become parallel to the axis 76 of the holder 71.

With the inserts 1a and 1b attached to their corresponding insert pockets 74 and 75, the clearance angle of the side face 3 along the second cutting edge 2 is equal to the clearance angle of the side face 3 along the first cutting edge 11. This improves the cutting edge strength of the second cutting edge 21, thereby reducing fracture of the second cutting edge 21.

Although the foregoing embodiment has described the case where both of the axial rakes of the insert pockets 74 and 75 are positive, for example, both of the axial rakes of the first and second insert pockets may be negative. Alternatively, the axial rake of the second insert pocket may be positive, and the axial rake of the first insert pocket may be negative. Other constructions are similar to those in the drill 60 according to the first embodiment.

<Method of Cutting Work Material>

Figure 13:
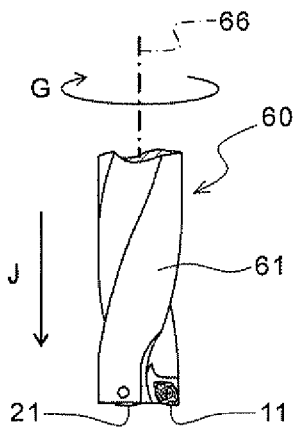
FIGS. 13(a) to 13(c) are schematic explanatory drawings showing a method of cutting a work material according to an embodiment of the present invention.
Figure 13:
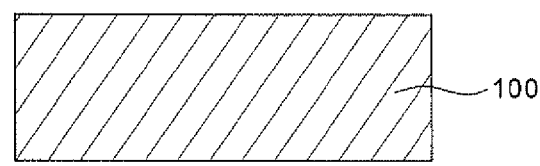
Figure 13:
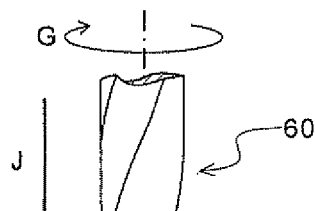
Figure 13:
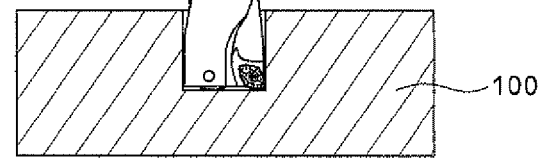
Figure 13:
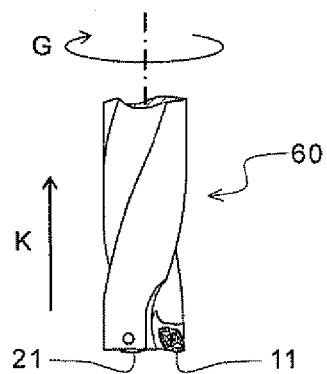
Figure 13:
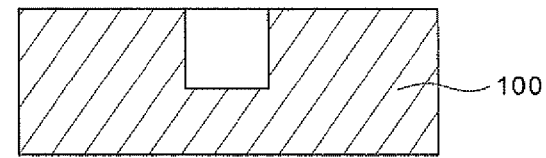

Next, an embodiment according to the method of cutting a work material in the present invention is described in detail with reference of FIGS. 13(a) to 13(c) by taking, for example, the case of using the drill 60 according to the first embodiment. In FIGS. 13(a) to 13(c), similar reference numerals are used to denote the components similar to those in FIGS. 1 to 12(b) described above, and the descriptions thereof are omitted.

The method of cutting the work material according to the present embodiment includes the following steps (i) to (iv):

(i) the step of rotating the drill 60 around the axis 66 of the holder 61 in the direction indicated by the arrow G as shown in FIG. 13(a);

(ii) the step of bringing the first cutting edge 11 and the second cutting edge 21 of the drill 60 near the work material 100 by moving the drill 60 in the direction indicated by the arrow J as shown in FIG. 13(a);

(iii) the step of cutting (hole-drilling) the work material 100 by further moving the drill 60 in the direction indicated by the arrow J as shown in FIG. 13(b) so that at least a part of the first cutting edge 11 and at least a part of the second cutting edge 21 of the drill 60 are brought into contact with the surface of the work material 100; and (iv) the step of separating the first cutting edge 11 and the second cutting edge 21 from the work material 100 by moving the drill 60 in the direction indicated by the arrow K as shown in FIG. 13(c).

Hereat, the insert 1 according to the first embodiment is attached to the drill 60. Therefore, in the step (iii), the cutting can be carried out while smoothly discharging the chips generated by both the first cutting edge 11 and the second cutting edge 21. As a result, the drill 60 can exhibit excellent machining accuracy, thus achieving a satisfactory machined surface on the work material 100 under more severe cutting conditions or high degree of difficulty. The drill 60 is particularly suitable for cutting the work material 100 having excellent ductility, such as a stainless steel or a low carbon steel.

In the step (i), either one of the drill 60 and the work material 100 may be rotated. In the step (ii), the individual cutting edges 11 and 21 and the work material 100 may be relatively brought near. For example, the work material 100 may be brought near the individual cutting edges 11 and 21. Similarly, in the step (iv), the work material 100 and the individual cutting edges 11 and 21 may be relatively separated. For example, the work material 100 may be separated from the individual cutting edges 11 and 21. When the cutting (machining) is continued, the step of bringing the individual cutting edges 11 and 21 of the drill 60 into contact with different points of the work material 100 may be repeated, keeping the state in which either one of the drill 60 and the work material 100 is rotated. When the cutting edge in use is worn, the unused cutting edge may be used by rotating the insert 1 180 degrees with respect to the central axis of the through hole 50.

While the several embodiments of the present invention have been described and illustrated above, the present invention is not limited to the inserts and the drills according to their respective corresponding embodiments, and it may be an insert and a drill according to an embodiment which is a combination of one embodiment and another embodiment.

For example, the shape of the upper portion of the first raised part can be made in a shape which is a combination of the upper portion 31 of the insert 1 according to the first embodiment and the upper portion 43 of the insert 41 according to the second embodiment. That is, the upper portion of the first raised part according to this embodiment is inclined to lie at a lower position toward the second cutting edge, and also inclined to lie at a lower position toward the center of the upper face. Thereby, the level difference between the first raised part and the second region can be decreased, and the height of the first raised part can be maintained, thus enhancing the chip discharge performance of both the first and second cutting edges. Other constructions are similar to those in the insert according to each of the foregoing embodiments.

The present invention is not limited to the foregoing embodiments, and various improvements and changes can be made thereto within the scope of claims. For example, although in the foregoing embodiments the upper portions of the first and second raised parts are comprised of the inclined face, the present invention is not limited thereto. That is, these upper portions may be a planar one such as a flat face or a curved face, a ridge, or the like.

Although in the insert 1 according to the first embodiment, the description has been made by taking, for example, the case where the upper portion 31 of the first raised part 30 is located at a higher position than the first cutting edge 11 in the thickness direction, the upper portion may be located at the same position as the first cutting edge, or a lower position than the first cutting edge as long as it is located at a higher position than the second region 22.

Although in the individual embodiments both the first and second cutting edges have their respective lands, the rake face may be formed continuously to the cutting edge without having the land. Although the shapes of the rake face and the breaker portion are formed in the shape whose cross section is curved, for example, they may be a shape having a flat bottom face between the rake face and the breaker portion. Alternatively, like a rake face having a two-step rake angle, one whose rake face is comprised of a plurality of faces may also be employed.

Although in the drills according to the individual embodiments the description has been made by taking, for example, the case of attaching the insert 1 according to the first embodiment, it is capable of exhibiting excellent chip discharge performance if the insert 41 or 45 according to the second or third embodiment is attached instead of the insert 1.

The invention claimed is:

1. A drill insert with a corner part and an upper face, the upper face having a first side and a second side disposed on both sides of the corner part, respectively, comprising:
    a first cutting edge formed along the first side;
    a second cutting edge formed along the second side;
    a first region of the upper face located along the first cutting edge;
    a second region of the upper face located along the second cutting edge; and
    a first raised part which is disposed in the first region and is configured to lie at a higher position than the second region, wherein
    the first raised part comprises an upper portion, a breaker portion configured to be inclined so as to become lower as the first raised part extends from the upper portion toward the first cutting edge, and a side portion configured to be inclined so as to become lower as the first raised part extends from the upper portion toward the second region, and
    the first raised part is disposed at a position closer to the first cutting edge than a bisector of an angle formed between the first cutting edge and the second cutting edge when viewed from above, and
    an inclination angle of the side portion is increased as the side portion extends toward a center of the upper face.

2. The drill insert according to claim 1, wherein the first raised part is formed so as to become further away from the bisector as the first raised part extends toward a center of the upper face when viewed from above.

3. The drill insert according to claim 1, wherein an angle between the second cutting edge and the side portion when viewed from above is 85 to 95 degrees.

4. The drill insert according to claim 1, wherein the upper portion is inclined so as to become at a lower position as the upper portion extends toward the second cutting edge.

5. The drill insert according to claim 1, wherein the upper portion is inclined so as to become at a lower position as the upper portion extends toward a center of the upper face.

6. The drill insert according to claim 1, wherein the upper portion is inclined so as to become at a lower position as the upper portion extends toward the second cutting edge and also inclined to become at a lower position as the upper portion extends toward a center of the upper face.

7. The drill insert according to claim 1, further comprising a second raised part disposed in the second region so as to lie at a lower position than the first raised part, wherein
    the second raised part comprises an upper portion, and a breaker portion inclined so as to become at a lower position as the second raised part extends from the upper portion toward the second cutting edge.

8. The drill insert according to claim 7, wherein the upper portion of the second raised part is inclined so as to become at a higher position as the upper portion extends toward the first cutting edge.

9. A drill, comprising:
    a holder comprising a first insert pocket formed at an outer periphery side of a tip end portion thereof, and a second insert pocket formed at a central axis side of the tip end portion thereof; and
    a pair of the drill inserts, each drill insert being according to claim 1, wherein
    one of the pair of the drill inserts is attached to the first insert pocket so that at least a part of the first cutting edge protrudes from the tip end of the holder, and the other is attached to the second insert pocket so that at least a part of the second cutting edge protrudes from the tip end of the holder.

10. The drill according to claim 9, wherein an axial rake of the second insert pocket is larger than an axial rake of the first insert pocket.

11. The drill according to claim 10, wherein both of the axial rake of the first insert pocket and the axial rake of the second insert pocket are positive.

12. A method of cutting a work material, comprising:
    rotating one selected from the group consisting of the drill according to claim 9 and a work material;
    bringing the first cutting edge and the second cutting edge of the drill closer to the work material;
    cutting the work material by bringing the first cutting edge and the second cutting edge of the drill into contact with the surface of the work material; and
    separating the first cutting edge and the second cutting edge from the work material.

* * * * *